March 15, 1955     F. F. C. RÖSCHLAU     2,704,230
ANTI-FRICTION AND SLIDING BEARINGS
Filed April 6, 1949

Inventor:
FRITZ FRANZ CONRAD RÖSCHLAU
BY Robert E. Burns
ATTORNEY 2,704,230

ANTI-FRICTION AND SLIDING BEARINGS

Fritz Franz Conrad Röschlau, Frankfurt am Main, Germany, assignor to Herbert Clemmens, Los Angeles, Calif.

Application April 6, 1949, Serial No. 85,874

14 Claims. (Cl. 308—8)

The present invention relates to improvements in and relating to the manufacture of anti-friction and sliding bearings permitting the manufacture of bearings of this kind with comparatively low expenditure of material and labor yet having high load capacity and long like service. These sliding bearings have an additional feature in that they can be manufactured, according to the invention, in a great variety of sizes in the manner known with anti-friction bearings as readily applicable and exchangeable units.

With the known anti-friction bearings and in particular ball bearings which can support either only radial or radial and axial loads, the interconnection of the bearing parts is accomplished by rolling bodies that is balls interpositioned between the faces of the inner and the outer race. To permit the filling in of the balls and provide a striking connection with the inner and the outer ring into the raceways, the radial gap between the inner and the outer race must be wide enough. The number of balls with these bearing designs is limited by the space available for insertion. For the accommodation of a larger number of balls, both the inner and the outer race frequently have been provided with a round recess approximating the ball radius and reaching down to the base of the raceway, so that when the said recesses are opposed the balls can be inserted singly into the enlarged intermediate space. These recesses, however, weaken the cross section of the two races and reduce considerably the load capacity of the bearing.

The accommodation of the necessary ball cage requires an ample distance betwen the balls, as in the described manner of assembly the ball cage necessarily consists of two rings, which enclose the balls laterally. There must also be intermediate spaces of sufficient width between the balls in order to permit the joining of the rings by rivets or the like. The limited number of balls due to the necessity of providing for the insertion of the balls and to accommodate the ball cage leads to a higher load on every single ball and to a diminution of the load carrying capacity of the races.

With regard to the assembly the depth of the raceway can only be made very small, as with deeper raceways the radial gap for the insertion of a sufficient number of balls will be too small. The small depth of the raceways results in the diagonally opposed edges of the raceways of the inner and the outer ring having to support an increased load under axial stress of the bearing and the balls have a tendency to jam between the raceway edges, the distance between which is far greater than the ball diameter, and press them asunder.

With other designs of ball bearings constituting a further development, it has been tried to eliminate this drawback, partly by dividing one of the two races radially in two halves, in which case however the two halves of the race after the insertion of the balls must be joined by additional parts, as shrink collars or the like. This is not only every onerous but also weakens the cross section of the race at the places at which the parts used to join the two race halves project into the material. The axial load is in this case imparted in proportion to the race joining parts the cross section of which will always be smaller than that of the race.

Also with the known readily applicable sliding bearing units with dimensions as usual with anti-friction bearing units, there are considerable difficulties to overcome if it is necessary to insert a closed race with spherical or curved face into the outer race in which the oil film, which in conformity with the art is indispensable with sliding bearings to obtain a liquid friction, should not be detrimentally impaired by transversely running assembly joints both in the outer and in the inner race. All proposals for the assembly of races with spherical or curved faces made hitherto have either recesses provided in the outer race, which have to be filled up again after partial or complete insertion of the race, or divided races consisting of separate concentric parts in order to permit the application of the unit into the outer race. Even if it is possible with considerable difficulty to close partially or tightly the assembly gaps by fillers, it is not possible to completely eliminate the drawback of the weakened cross section at these points and the detrimental effect on the oil film of separating joints extending transversely through the raceway. Both the fillers and the parts for the assembly of the composite inner race must be sufficiently secured against falling out and against axial and radial displacement, which necessitates either an intricate shape of the parts of the bearing or further additional fastening means.

To obtain a safe operation there have been provided besides the parts for the inner and the outer race, additional parts in the shape of lateral rings or lateral discs mounted into the apertures of the outer race. These lateral parts have the task of protecting the revolving bearing parts and the raceways from the penetration of foreign matter and to separate them partly from the oil sump in order to avoid the formation of oil foam, and further to provide a better feeding of the lubricant to the raceways, to support partly or wholly the axial load of the bearing, and to serve other special purposes. Also the application of lateral rings or lateral discs requires safeguarding against radial displacement and against loosening from the asembly of the other parts of the bearing. To avoid that, the length of the readily applicable sliding bearing units does not exceed the dimensions provided for with anti-friction bearings, it being necessary to reduce still more the length of the bearing which is already very short to enable the space so provided, to be used for the accommodation of the lateral rings. Thus the axial length of the sliding way is further reduced which highly endangers the reliability in service of the bearing, even when making use of all remedies that have been proposed for that purpose.

The design of sliding bearings depends in a high degree on the attainment of a bearing which is substantially free from wear and tear in order to obtain a liquid friction. This liquid friction is obtained, as is known, by a hydrodynamic effect in which the revolving part carried by the rotating journal of the bearing is lifted semi-circularly from the reposing bi-centricity into the bearing co-center, so that the metallic surfaces of contact of the bearing lose contact. This hydrodynamic effect can only be effective, if in addition to the surface finish, properties of the material and bearing play, other conditions are present, that is a sufficiently elevated journal speed and oil pressure, and a consistency of the lubricant adapted to the prevailing service conditions. It is obvious that it is not always easily possible to meet these requirements in every respect, particularly in the case where sliding bearing is substituted for a ball bearing as the service conditions for the ball bearing are quite different.

The method according to the invention obviates all these drawbacks of the known designs and relates to the manufacture of sliding and anti-friction bearings with an inner and an outer race and rolling or sliding bodies between them.

According to the invention lateral rings are provided at their sides facing each other with grooves forming a part of the rolling or sliding ways, whereupon the outer annular part of the unit thus formed is separated from the inner annular part thereof in a coaxial cylindrical plane, preferably extending through the centers or axles of the rolling or sliding bodies. The same position of the grooves in the two lateral rings forming the rolling or sliding ways simultaneously permits the grooving thereof, having the desired cross section of the rolling or sliding ways by means of the same tool, thus securing a conformity true to size and shape. This is advantageous not only from a manufacturing standpoint but also economically in comparison with the known anti-friction bearings, the non-uniform faces of which have to be machined with different tools and a plurality of operations.

In the drawings are illustrated the forms of embodiment for the assembly of an anti-friction bearing which is in this case a ball bearing and of a sliding bearing. Further features of the invention will appear from the following detailed description.

Figure 1:
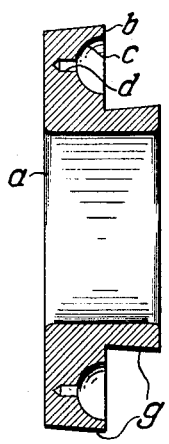
Fig. 1 is a cross section of one (left-hand) lateral ring with stepped outside cylindrical surface and one half of the ball race for the assembly of a ball bearing.

According to Fig. 1 the (left-hand) lateral ring $a$ is stepped down on its outside surface substantially in the middle of its axial length so far that an annular area $b$, perpendicular to the axis, of sufficient size is formed. A groove $c$ constituting a part of the ball race is machined therein, the axial cross section of which corresponds approximately to the half of the ball cross section. The lateral ring thus designed therefore consists of an outer flange portion incorporating the ball race groove $c$ and and an adjacent tubular portion. At the greatest depth of the ball race the lateral ring is provided with a narrow, preferably inwardly pointed slot $d$ machined in axial direction, the depth of which is limited in so far as the connection of the outer and inner ring parts must be maintained.

Figure 2:
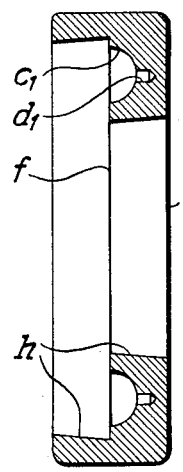
Fig. 2 is a cross section of the (right-hand) opposite lateral ring for the assembly of a ball bearing with stepped internal cylindrical surface and one half of the ball race.

Fig. 2 shows the inside surface of the other (right-hand) lateral ring $e$ substantially in the radial center plane thus forming an annular area $f$ inside and perpendicular to the axis, the diameter of which is only very slightly smaller than that of the annular area $b$ of the lateral ring $a$. The annular area $f$ is formed with a groove $c_1$ constituting a similar ball race portion arranged as to position and shape symmetrically to the annular area $f$ of the lateral ring $a$ and presenting a similar slot $d_1$. The second lateral ring thus designed therefore consists of an internal flange portion incorporating the ball race groove $c_1$ and an adjacent tubular portion.

The stepped surfaces $g$ of the outside surface of the lateral ring $a$ and that of the inside surface $h$ of the lateral ring $e$ are preferably made slightly cone-shaped so that they taper with the (left-hand) lateral ring $a$ towards the larger lateral annular area (flange portion) and increase in diameter with the (right hand) opposite lateral ring $e$ towards the larger lateral annular area (flange portion), thus providing after the assembly of the two rings (Figs. 8 and 9) the drawing together of the two lateral rings $a, e$. In the drawing the cone-shaped surfaces are illustrated enlarged.

If in the foregoing or in the following there is the question of the "right-hand" or of the "left-hand" lateral ring, this is only for reasons of better distinction. Of course the two rings may be exchanged in practice.

Figure 3:
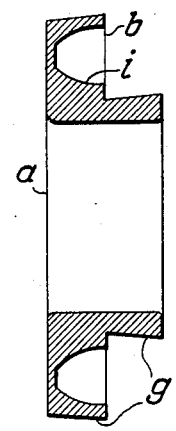
Fig. 3 is a cross section of a similar (left-hand) lateral ring as in Fig. 1 however for the assembly of a sliding bearing with one half of the sliding way.
Figure 4:
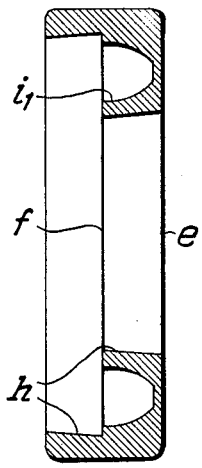
Fig. 4 is a cross section of a similar (right-hand) lateral ring as in Fig. 2 however for the assembly of a sliding bearing with one half of the sliding way.
Figure 6:
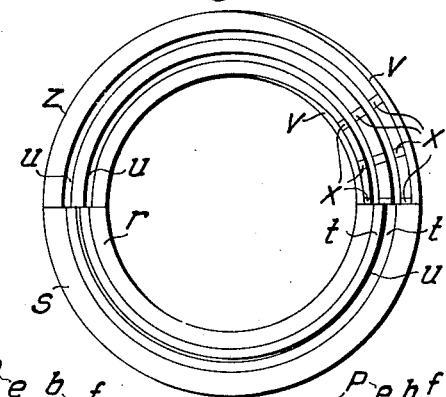
Fig. 6 is a side elevation of the sliding ring for the sliding bearing partially in section along the line I—I of Fig. 7.
Figure 7:
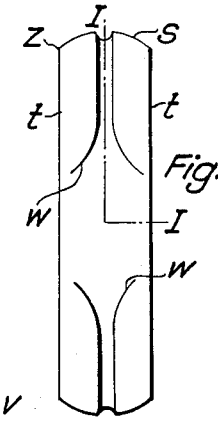
Fig. 7 is a view of the outer curved surface of the sliding ring with grooves ending in it.
Figure 9:
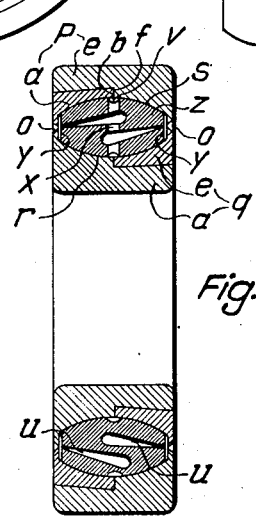
Fig. 9 is a cross section of an assembled sliding bearing unit.

The lateral rings according to Figs. 3 and 4 serve to form a sliding bearing and are provided in lieu of ball races each with a sliding way half $i$ or $i_1$, the axial cross sections of which corresponds approximately to the half cross section of the sliding ring $z$ illustrated in Figs. 6, 7 and 9, taking into consideration the play of the bearing. Instead of the radial slots $d$, $d_1$, the sliding way halves $i$, $i_1$ are kept in every case slightly deeper than half the axial length of the sliding ring $z$ so that the latter can not run up laterally of the sliding way under axial load.

Otherwise the lateral rings are kept perfectly equal for the assembly of each predetermined size of an anti-friction or sliding bearing, with the exception of the races $c$, $c_1$ or sliding ways $i$, $i_1$. The lateral machining of the race halves is advantageous since their symmetry permits the exact transposition of their cross sections by means of the same tool to the corresponding opposite ring.

Figure 5:
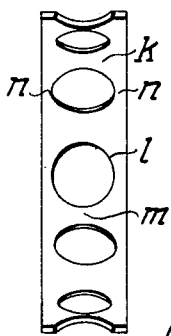
Fig. 5 is a cross section of a cylindrical ball cage through an axial plane.

The inner revolving parts of the examples illustrated, namely a cage $k$ for the balls or rollers (Fig. 5), and the balls or cylindrical or barrel-shaped rollers in the case of an anti-friction bearing or a sliding ring $z$ (Figs. 6, 7 and 9) in the case of a sliding bearing, may be inserted without difficulty into the open race or sliding way halves. The ball cage $k$ preferably consists of a cylindrical ring provided on its periphery, namely in the middle of its axial length at regular intervals, with holes $l$ which are somewhat larger in diameter than the balls which they take up with a play.

Of course, as already mentioned, such a cylindrical annular cage may be designed to take up also other rolling bodies such as cylindrical or barrel-shaped rollers. In such cases the holes must be formed so as to correspond to the largest cross section in axial direction at the same time taking certain play into consideration. Consequently the race halves have to be profiled accordingly.

The distance $m$ between the holes of the cage $k$ can be made very small so that as great a number of rolling bodies as possible can be accommodated in the cage. When assembling, the cage $k$ for the rolling bodies is positively guided with the ring sides $n$ remaining free laterally of the holes in the lateral slots $d$, $d_1$ of the lateral rings $a$, $e$ with sufficient radial and axial play of the raceways. Thus the rolling bodies (not illustrated) are kept on the greatest extension of their surface so that they cannot jam in the cage when revolving.

When assembling the bearing, that is, when joining the rings $a$, $e$, it is preferable to cool the lateral rings $a$ (Figs. 1 and 3) until a measurable diminution of the diameters of their outside surfaces $g$ is obtained, while the opposite lateral rings $e$ (Figs. 2 and 4) may be heated so far as it is possible without detrimental effect to the material. In this way the different diameters of the very slightly cone-shaped surfaces, which preferably slightly intersect each other when they have the same temperature, are temporarily equalized so that the lateral rings $a$, $e$ can easily be joined. The assembly of the lateral rings $a$, $e$ is facilitated if the slots $d$, $d_1$ are provided with an outwardly extending bore through which the air may escape.

Figure 8:
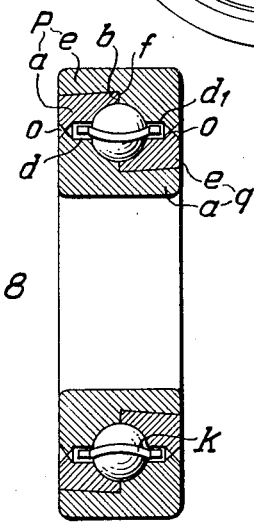
Fig. 8 is a cross section of an assembled ball bearing unit.

After joining the two lateral rings $a$, $e$ to form first one completely closed ring in which the inner parts, namely the rolling bodies with cage $k$ or a sliding ring $z$ are invisibly completely enclosed, the joined ring is maintained under pressure until an equalization of temperature occurs or the movement of heat from one lateral ring to the other ceases, in order to favour during this time the process of mutual drawing together of the two rings towards the common central plane $b$—$f$ (Figs. 8–9).

By means of a slight radially ground notch $o$ in the plane lateral areas of the rings $a$, $e$, immediately adjacent the radial slots $d$, $d_1$ provided inside the joined ring or in the axial plane of symmetry of the cross section of the sliding ways $i$, $i_1$, the completely closed ring is separated into two rings $p$ and $q$, both of which are formed of the joined radial ring parts of the original lateral rings. The inner rings $q$ and the outer ring $p$ thus obtained, being in connecting engagement with the built-in rolling bodies and the cage $k$ or the built-in sliding ring $z$ now constitute a self-contained, readily applicable anti-friction or sliding bearing unit. In substitution of the ground notch $o$ it is also possible to grind off the outside of the lateral rings $a$, $e$ in a plane up to the slots $d, d_1$.

Preferably the ground notches or the face-grinding is made only deep enough for the separation of the outer and the inner ring. Thus the penetration of foreign matter into the interior of the bearing is avoided.

The sliding ring $z$ has, in the example illustrated, an approximately oval cross section with an inner sliding way $r$ and a congruent outer sliding way $s$ which are limited at both ends by lateral annular areas $t$ into which preferably slots $u$ expanding internally, preferably on the center line of the cross sectional area, are machined. The lateral flattenings $t$ isolate the internal ring $z$ from the oil level so that the lubricant is not submitted to a centrifugal action and no formation of oil foam occurs which would be disadvantageous because it impedes the oil supply and may lead to running dry.

The slots $u$ are positioned so as to have a slight inclination, so that at the place of their greatest depth they lie one upon each other as illustrated in Figs. 6 and 9. Thus the axial cross section of the ring $z$ will be Z- or S-shaped, due to which the ring obtains an elasticity within the conditions provided by the slots $u$ which remains effective with a correspondingly chosen material.

On its inner and outer surface, i. e. preferably in its plane of symmetry, the ring $z$ is provided with narrow eccentric grooves $v$. The grooves taken, enlarging at their ends $w$ in the curved sliding ways $r$ and $s$. In their greatest depth the grooves $v$ present a number of adjacent holes $x$ through which both the grooves $v$ and the slots $u$ communicate with each other. In the operation of the bearing the slots $u$ serve, in addition to the previously mentioned purpose of heat dissipation, the reception of the lubricant entering through the notch $o$ into slots $u$ fed through the passages $x$ to the grooves $v$ for distribution over the sliding ways by means of the enlarged groove ends $w$ arranged in the direction of rotation. The grooves enlarging in a direction opposite the direction of rotation catch the lubricant laterally or to maintain it in the middle of the sliding way. As the sliding ways are kept somewhat deeper than the corresponding half axial length of the sliding ring body $z$, a small intermediate space $y$ is formed between the lateral areas $t$ of the ring $z$ and the inner and outer rings $p$ and $q$ of the bearing at the place of the notch $o$ which favours the lubrication, prevents the axial mutual pressure of the bearing rings, so that edge pressure is avoided, but permits also a slight inclination of the journal axis within the limits of the bearing play and gives to the minimum elastic sliding ring $z$ the necessary lateral freedom of motion.

The sliding ring $z$ constitutes the steel support of a bearing metal with which it is jacketed with metallic touch. As the bearing metal, corresponding in composition is more or less susceptible to shocks and dilates more than the steel core with rising temperature, the mutual metallic touch as well as the smoothness of the sliding surfaces is endangered by the said influences. The invention obviates these drawbacks due to the unequal dilatation of the materials assembled in one unit by keeping the volume of the material of the sliding ring small, by means of cavities provided by the radial slots, so that on the one hand a heat retaining effect is impeded and on the other the heat dissipation is favoured. Further the susceptibility of the bearing metal to shocks, edge pressure or jamming owing to a faulty assembly is avoided by the pressure and shock absorbing action of the internally minimum elastic ring.

As may be seen from Figs. 8 and 9, the parts incorporated between the rolling or sliding ways $c$, $c_1$ or $i$, $i_1$ (cage or sliding ring) are almost completely enclosed by the externally completely plane inner and outer rings $p$ and $q$ curved down laterally as far as to the extremely narrow radial notch $o$ whereby, as already mentioned, the penetration of foreign matter into the interior of the bearing is prevented and a detrimental formation of oil foam is avoided.

With the design according to the invention a sliding bearing operated by a rotating journal transmits the rotation by friction of the sliding ways $i$, $i_1$ of the inner bearing ring $q$ to the sliding way $s$ of the sliding ring $z$ so that the latter can be carried along in the direction of rotation. As soon as the inner bearing ring $q$ takes up more heat owing to friction the bearing play of the said sliding ways sliding upon each other is reduced due to the dilatation of the inner ring, whereby the sliding ring $z$ is carried along by the inner bearing ring $q$ so that now both rings are rotating and the sliding ring $z$ is sliding with its outer sliding way in the sliding way $i$, $i_1$ of the outer bearing ring as long as the sliding ring $z$ growing under the influence of heat reduces the outer bearing play and increases the inner play so that the ring $z$ now will come to a standstill and the sliding way $i$, $i_1$ of the internal ring $q$ cooperates with the sliding way $s$ of the ring $z$. In this way a continuous change of the sliding ways sliding upon each other will take place, which will continue following another sequence. As an opposite rotation of the inner and the outer bearing ring will scarcely occur, only one set of sliding ways will cooperate. Owing to this circumstance, the operating set of sliding ways disposes totally of the lubricant fed to the radial slots $u$ in consequence of the hydrodynamic suction effect favoured by the concentric slots $v$, so that the working sliding ways are sufficiently provided with lubricant.

I claim:

1. An annular intermediate structure adapted to form an anti-friction bearing upon the cutting of a circular groove in each end face thereof comprising a first ring and a second ring, said first ring comprising an outer radial flange portion provided with a groove in an axial end face thereof and an inner axial tubular portion adjacent said face, and said second ring comprising an inner radial flange portion having a central aperture for receiving said axial tubular portion of the first-named lateral ring and being provided on an axial end face thereof with a groove in alignment with said first-named groove to define an annular channel and an outer axial tubular portion adjacent said last-named face defining an axial aperture adapted to receive said radial flange portion of the first-named lateral ring, the axial dimension of each of said rings being equal and the combined axial width of the tubular portion and the flange portion of each of said rings corresponding to the axial width of the complete annular structure formed by the interengagement of the two rings, and anti-friction means disposed in said annular channel, whereby when a groove is cut in the end faces a depth to communicate with said annular channel a bearing is provided which has an outer race and an inner race defined by the radially inner and radially outer halves, respectively of said first ring and said second ring.

2. An annular intermediate structure adapted to form an anti-friction bearing as defined in claim 1, wherein said face of said first-named lateral ring is substantially at the center of the axial length of said ring to provide an annular area perpendicular to the axis of said first-named ring.

3. An annular intermediate structure adapted to form an anti-friction bearing as defined in claim 1, wherein said face of said second-named ring is substantially at the center of the axial length of said ring to provide an annular area perpendicular to the axis of said second-named ring.

4. An annular intermediate structure adapted to form an anti-friction bearing as defined in claim 1, wherein the cooperating surfaces of said first-named lateral ring and said second-named lateral ring are conically shaped for complementary engagement.

5. An annular intermediate structure adapted to form an anti-friction bearing as defined in claim 1, wherein the radially outer surface of said inner axial tubular portion of said first-named ring tapers inwardly in the direction of said radial flange portion and the radially outer surface of said radial flange portion tapers outwardly in the direction of said inner axial tubular portion and wherein the radially inner surface of said outer axial tubular portion of said second-named lateral ring tapers outwardly in the direction of said inner radial flange portion and the radially inner surface of said inner radial flange portion tapers inwardly in the direction of said outer axial tubular portion.

6. An annular intermediate structure adapted to form an anti-friction bearing as defined in claim 1, wherein the grooves for the reception of the anti-friction bodies are provided at their inner ends with axial internally pointed-slots.

7. An annular intermediate structure adapted to form an anti-friction bearing as defined in claim 1, wherein the cooperating surfaces of the two rings have slightly different diameters when at the same temperature.

8. An annular intermediate structure adapted to form an anti-friction bearing as defined in claim 1, wherein the radial flange portions of said first ring and said second ring meet along a radial plane passing through the center of the antifriction means disposed in said annular channel.

9. An annular intermediate structure adapted to form an anti-friction bearing as defined in claim 1, wherein said anti-friction means comprise a plurality of balls and wherein said channel is formed with continuous axial slots and said balls are mounted in an annular cage having its sides received and guided by said slots.

10. An annular intermediate structure adapted to form an anti-friction bearing as defined in claim 1, wherein said anti-friction means comprise a sliding body in the form of a ring disposed in said channel.

11. An annular intermediate structure adapted to form an anti-friction bearing as defined in claim 10, wherein said anti-friction ring has a substantially oval cross-section.

12. An annular intermediate structure adapted to form an anti-friction bearing as defined in claim 10, wherein said anti-friction ring is formed with non-intersecting slots extending into the interior of the ring, said slots projecting into different halves of the ring and overlapping themselves at their innermost ends.

13. An annular intermediate structure adapted to form an anti-friction bearing as defined in claim 12, wherein the anti-friction ring is provided approximately in the plane perpendicular to the axis of the annular structure with at least one groove along its peripheral surface and the bottom of said groove is formed with apertures communicating with said slots.

14. An annular intermediate structure adapted to form an anti-friction bearing as defined in claim 10, wherein the anti-friction ring is provided with at least one groove along its peripheral surface lying approximately in the plane perpendicular to the annular structure.

References Cited in the file of this patent

UNITED STATES PATENTS

| 1,093,348 | Mooers | Apr. 14, 1914 |
| 1,776,412 | Bresien | Sept. 23, 1930 |
| 1,783,791 | Hughes | Dec. 2, 1930 |
| 1,877,486 | Brownlee | Sept. 13, 1932 |
| 2,045,030 | Thompson | June 23, 1936 |
| 2,400,374 | Selnes | May 14, 1946 |
| 2,449,944 | Johnson | Sept. 21, 1948 |
| 2,491,728 | Grafton | Dec. 20, 1949 |
| 2,614,898 | Adams | Oct. 21, 1952 |

FOREIGN PATENTS

| 209,101 | Great Britain | Mar. 26, 1925 |
| 217,848 | Great Britain | June 26, 1924 |
| 239,592 | Switzerland | Feb. 18, 1946 |
| 832,430 | France | Sept. 27, 1938 |